United States Patent [19]

Lang et al.

[11] Patent Number: 4,465,253
[45] Date of Patent: Aug. 14, 1984

[54] FLEXIBLE LINE SUPPORT ASSEMBLY

[75] Inventors: Clifford H. Lang, Long Beach; Michael S. Biss, Westminster, both of Calif.

[73] Assignee: The United States of America as represented by the Secretary of the Air Force, Washington, D.C.

[21] Appl. No.: 486,598

[22] Filed: Apr. 19, 1983

[51] Int. Cl.³ .............................. B64G 1/10; B60D 1/08
[52] U.S. Cl. .................................. 248/75; 242/54 R; 414/680; 174/135
[58] Field of Search .................. 248/75, 79, 89, 90; 242/54 R, 96, 107, 86.1; 137/355.16, 355.17, 355.2, 355.26; 174/135; 191/12 R; 239/196; 414/7; 254/394

[56] References Cited

U.S. PATENT DOCUMENTS

| | | | |
|---|---|---|---|
| 588,378 | 8/1897 | Bean et al. | |
| 2,108,111 | 2/1938 | Ehrlich | 242/107 |
| 2,141,909 | 12/1938 | Hauser | 242/107 |
| 2,189,364 | 2/1940 | Kirsten | 248/79 |
| 2,812,640 | 11/1957 | Hartley | 254/394 |
| 3,145,725 | 8/1964 | Knights | 137/355.17 |
| 3,599,887 | 8/1971 | Maverna | 242/47.5 |
| 3,722,916 | 3/1973 | Muntjanoff | 248/75 |
| 3,879,659 | 4/1975 | Lawson, Jr. | 242/54 R |
| 3,901,270 | 8/1975 | Smith | 137/355.17 |
| 4,002,357 | 1/1977 | Bennett | 248/75 |

*Primary Examiner*—Ramon S. Britts
*Assistant Examiner*—Robert A. Olson
*Attorney, Agent, or Firm*—Donald J. Singer; John R. Flanagan

[57] ABSTRACT

An assembly for supporting a flexible service line between a base structure and an object body mounted to the base structure for movement about lateral and elevation gimbal axes includes lateral and elevation drums fixedly mounted to the body and base structure, respectively, and an arm interconnecting the drums. A spiral groove is defined in the periphery of each drum for receiving looped portions of the flexible line therein. The arm supports a portion of the line extending between its looped portions. Also, the arm is rotatably mounted at its opposite ends to the drums for accommodating relative movement between the body and base structure about the respective gimbal axes. The looped portions of the flexible lines are confined in the grooves on the drums and may expand and contract therein as the body moves relative to the base structure about the gimbal axes.

5 Claims, 3 Drawing Figures

FLEXIBLE LINE SUPPORT ASSEMBLY

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to devices for supporting a flexible line and, more particularly, is concerned with an assembly employing spirally-grooved drums for supporting a flexible line against movements induced by accelerations and vibrations in a space environment.

2. Description of the Prior Art

Large bodies, such as telescopes, antennae and the like, intended for use in a space environment usually require that flexible lines, such as fluid conduits and electrical cable, be coupled between a base structure and the object body while the body is reoriented or steered during operations. For example, a large telescope intended for deployment from the space shuttle or other space platform would require such interconnecting lines.

Ordinarily, the provision of slack in such flexible lines for accommodating movement and steering of the object body relative to the base structure would entail leaving portions of the flexible lines unsupported which, under normal operational vibrations and accelerations, could easily move about and cause damage to other equipment as well as disable functioning of the reoriented object body. Consequently, a need exists for some support arrangement which will continuously confine a flexible line but allow sufficient slack therein for accommodating relative movement between parts interconnected by the line.

SUMMARY OF THE INVENTION

The present invention provides a support assembly designed to satisfy the aforementioned needs. The unique feature of the assembly is a pair of support drums having deep spiral grooves about the peripheries thereof. The grooves in the drums receive and confine looped or wound portions of a flexible line while allowing outward expansion and inward contraction thereof within the drum grooves so as to provide slack in the line for accommodating relative movement of parts interconnected by the line. Thus, as an object body is slued or reoriented relative to a base structure, the looped portions of the line expand or contract in circumference within the deep grooves on the drum peripheries, while the sides of the grooves support the slack, looped portions of the line against movements induced by accelerations and vibrations.

Accordingly, the present invention is directed to an assembly for supporting a flexible line between a base structure and an object body mounted to the base structure for movement about first and second orthogonal axes. The assembly includes: (a) a first support drum mounted on the base structure and coaxially aligned with the first axis; (b) a second support drum mounted on the object body and coaxially aligned with the second axis; (c) means defined on each of the first and second support drums for receiving looped portions of the flexible line and confining the same about the drums such that the lines can expand and contract about the drums as the object body moves relative to the base structure about the first and second axes; and (d) an arm interconnecting the first and second support drums and supporting a portion of the flexible line which interconnects the looped portions thereof. In particular, the means defined on each of the first and second support drums is in the form of a wall which traverses a spiral peripheral path around each drum so as to define a spiral groove of sufficient depth to allow the circumference of each looped portion of the flexible line to expand outwardly, or contract inwardly, within the groove while laterally supported by the drum wall.

DETAILED DESCRIPTION OF THE INVENTION

Figure 1:
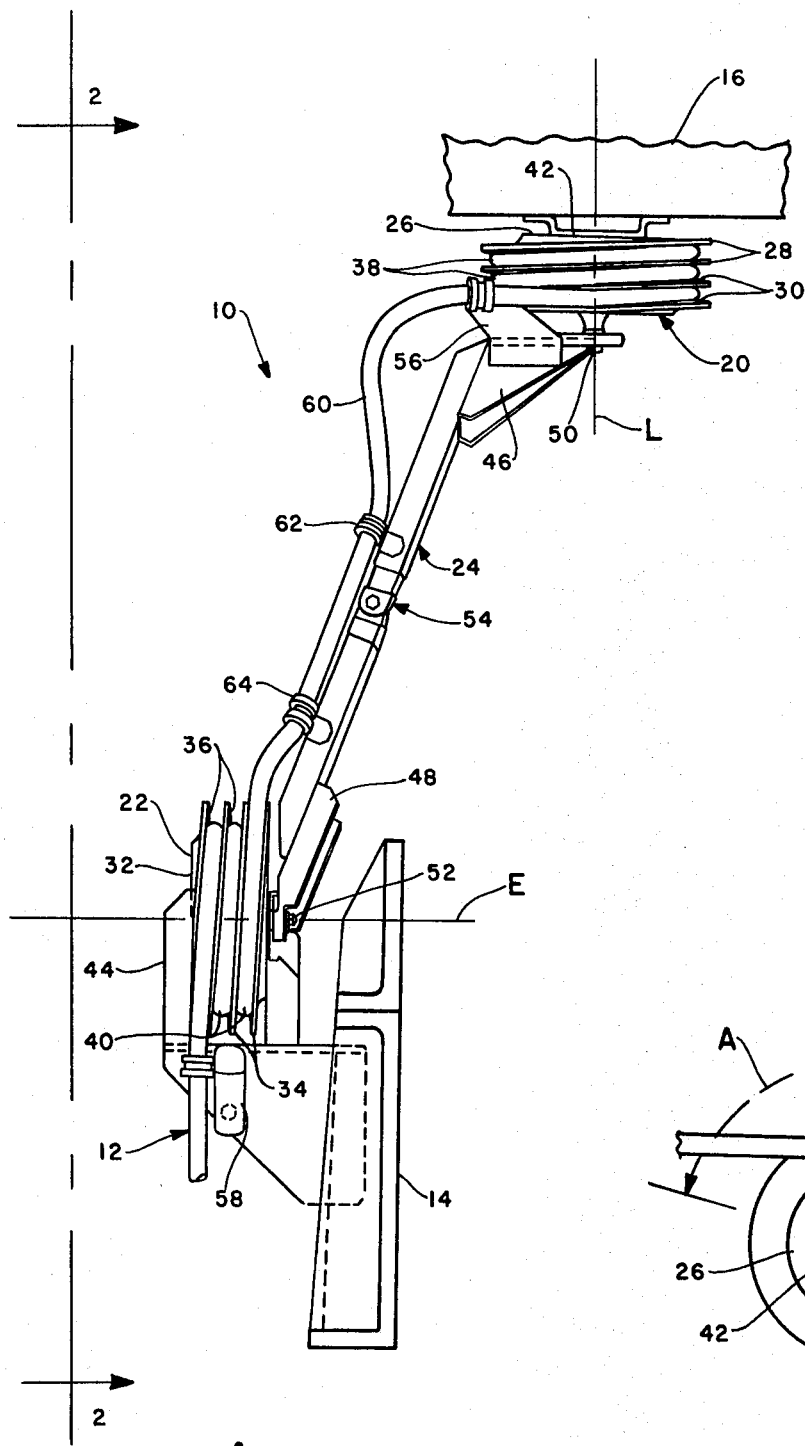
FIG. 1 is a fragmentary side elevational view of the flexible line support assembly embodying the principles of the present invention.
Figure 2:
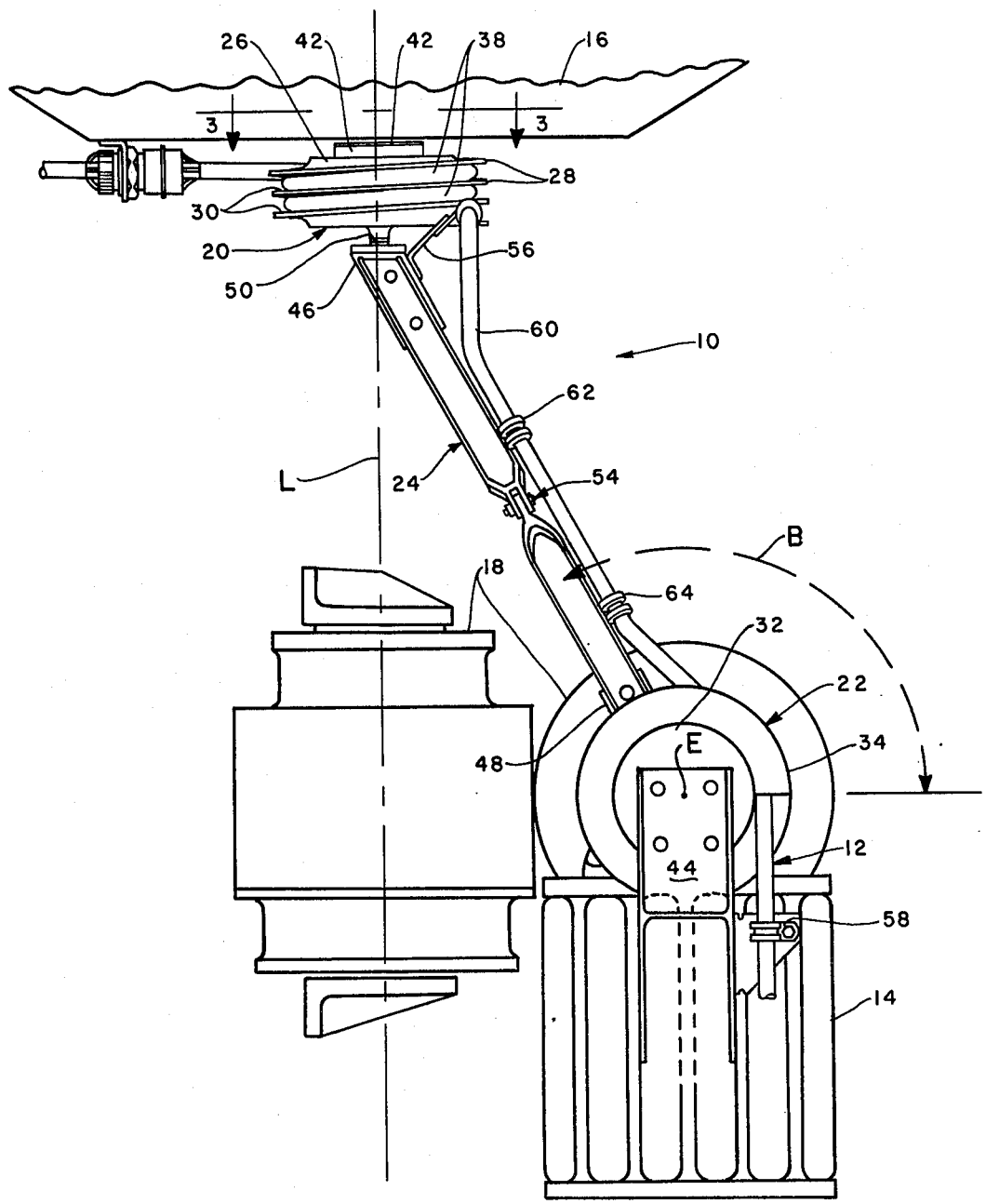
FIG. 2 is a fragmentary front elevation view of the aassembly as seen along line 2—2 of FIG. 1.

Referring now to the drawings, and more particularly to FIGS. 1 and 2, there is shown the preferred embodiment of the flexible line support assembly of the present invention, being generally designated 10. The assembly 10 preferably is used to support a flexible service line 12 which interconnects relatively movable parts, such as a base structure 14 of a space platform (not shown) and an object body 16 in the form of a telescope (a small portion of which is shown). The object body 16 is mounted by a gimbal structure 18 (the parts connecting body 16 to structure 18 being omitted for sake of clarity) to the base structure 14 for rotational movement about orthogonally-arranged lateral axis L and elevation axis E defined by the gimbal structure 18. The flexible service line 12, commonly in the form of electrical cable, fluid conduit and the like, must have slack in the portion thereof which extends between the base structure 14 and body 16 for accommodating movement of the body with respect to the structure about the gimbal axes L, E.

The flexible line support assembly 10 allows for the provision of slack in the flexible line 12. The assembly 10 basically includes a lateral drum 20, an elevation drum 22 and an arm 24 which interconnects the drums.

Figure 3:
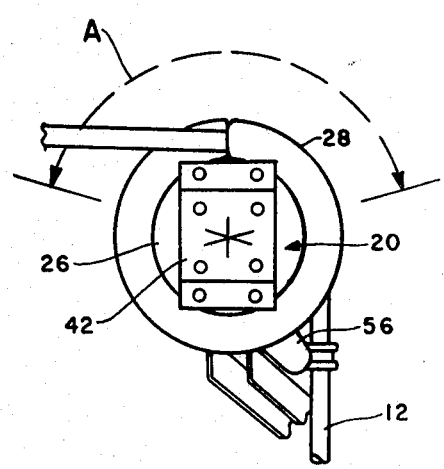
FIG. 3 is a fragmentary top plan view of the lateral drum as seen along line 3—3 of FIG. 2.

The lateral drum 20 has a hub 26 and a continuous wall 28 (see FIG. 3) which traverses a spiral or helical peripheral path around the hub so as to define a deep spiral groove 30. Likewise, the elevation drum 22 has a hub 32 and a continuous wall 34 which traverses a spiral or helical peripheral path around the hub so as to define a deep spiral groove 36.

The flexible service line 12 has wound or looped portions 38, 40 preformed to fit over-sized or loosely within the corresponding grooves 30, 36 on the drums 20, 22. The respective grooves 30, 36 are of sufficient depth to receive and confine therein the looped line portions 38, 40, while allowing outward expansion and inward contraction of the line portions within the respective grooves 30, 36. Also, during such expansion and contraction, the line is laterally supported within the grooves by the respective drum walls 28, 34. If desired, removable confining straps (not shown) may be installed across grooves 30 of drums 20, 22 to provide additional capability for retaining line 12 therein.

The lateral drum 20 is stationarily or fixedly mounted on the body 16 by a standoff bracket 42 so as to be coaxially aligned with lateral axis L. The elevation drum 22 is stationarily or fixedly mounted on the base structure 14 by another standoff bracket 44 so as to be coaxially aligned with elevation axis E. However, the arm 24 at its opposite ends is coupled to the lateral and elevation drums 20, 22, respectively, by support brackets 46, 48 and self-aligning ball bearings 50, 52 for rotation about the lateral and elevation axes L, E. The range of movement of the body 16 and drum 20 relative to the arm 24 is represented by dash arrow A in FIG. 3, while the range of relative movement of arm 24 to the base structure 12 and drum 22 is represented by dashed arrow B in FIG. 2. In such manner, movement of the drums 20, 22 relative to one another is accommodated by the arm 24. Also, a hinge 54 is incorporated by the arm 24 which allows it to articulate at a location generally intermediate between its opposite ends. The hinge augments the ability of the arm to accommodate relative motion of the drums. Particularly, the arm 24 is installed and rigged with the hinge 54 folded a predetermined displacement which is enough to compensate for any relative change of location between opposite ends of the arm 24. Such hinge displacement precludes transmission to the gimbal structure 18 of any loads induced by such relative location changes during gimbal translations. Moreover, the grooves 30, 36 on the drums 20, 22 are aligned generally transversely to the respective lateral and elevation axes L, E. Therefore, as the looped line portions 38, 40 expand outwardly, or contract inwardly, within their respective grooves as the body 16 and drum 20 therewith move relative to the base structure and drum 22, the looped portions move in planes generally parallel to those in which the body moves relative to the base structure about the gimbal axes L, E.

The looped portions 38, 40 of the flexible service line 12 are maintained in their respective positions wound about drums 20, 22 by clamping standoffs 56, 58 attached respectively the arm 24 and the base structure 12. Also, a portion 60 of the flexible service line 12 extending between its looped portions 38, 40 is attached to the arm by circular brackets 62, 64.

It is readily apparent, therefore, that the flexible line support assembly 10 accommodates two dimensional movement of the object body 16 relative to the base structure 14, that is, movement about lateral and elevation axes L, E defined by gimbal structure 18. While it was mentioned that the assembly 10 was designed for use in a space environment, it also has broad applicability to terrestrial activities.

It is thought that the flexible line support assembly of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An assembly for supporting a flexible line between a base structure and an object body mounted to said base structure for movement about first and second orthogonal axes, comprising:

(a) a first support drum mounted on said base structure and coaxially aligned with said first axis;
    (b) a second support drum mounted on said object body and coaxially aligned with said second axis;
    (c) means defined on each of said first and second support drums for receiving looped portions of said flexible line and confining the same about said drums such that said lines can expand and contract about said drums as said object body moves relative to said base structure about said first and second axes; and
    (d) an arm interconnecting said first and second support drums and supporting a portion of said flexible line which interconnects said looped portions thereof.

2. The assembly as recited in claim 1, wherein:

said first support drum is fixedly mounted on said base structure;
    said second support drum is fixedly mounted on said object body; and
    said arm has opposite ends which are coupled to said first and second support drums, respectively, for rotation about said first and second axes.

3. The assembly as recited in claim 1, wherein said arm includes:

opposite ends which are coupled to said first and second support drums, respectively, for rotation about said first and second axes; and
    a hinge which articulates said arm at a location therealong intermediately between its ends.

4. The assembly as recited in claim 1, wherein said means defined on each of said first and second support drums is in the form of a wall which traverses a spiral peripheral path around each drum so as to define a spiral groove of sufficient depth to allow the circumference of each looped portion of said flexible line to expand outwardly, or contact inwardly, within said groove while laterally supported by said drum wall.

5. An assembly for supporting a flexible line between a base structure and an object body rotatably mounted to said base structure about first and second gimbal axes, comprising:

(a) a first support drum fixedly mounted on said base structure and having a central axis coaxially aligned with said first gimbal axis;
    (b) a second support drum fixedly mounted on said object body and having a central axis coaxially aligned with said second gimbal axis;
    (c) a wall on each drum traversing a spiral peripheral path around each drum so as to define a spiral groove of sufficient depth to receive a looped portion of said flexible line, to confine said looped portion about said drum, and to allow the circumference of said looped line portion to expand outwardly, or contact inwardly, within said groove in planes generally parallel to those in which said object body moves relative to said base structure about said first and second gimbal axes; and
    (d) an arm interconnecting said first and second support drums and supporting a portion of said flexible line which interconnects said looped portions thereof, said arm having opposite ends being coupled to said first and second support drums, respectively, for rotation about said first and second gimbal axes as said object body moves relative to said base structure about said axes.

* * * * *